United States Patent
Vandame et al.

(10) Patent No.: US 10,832,382 B2
(45) Date of Patent: Nov. 10, 2020

(54) METHOD FOR FILTERING SPURIOUS PIXELS IN A DEPTH-MAP

(71) Applicant: INTERDIGITAL CE PATENT HOLDINGS, Paris (FR)

(72) Inventors: Benoit Vandame, Betton (FR); Neus Sabater, Betton (FR); Guillaume Boisson, Pleumeleuc (FR)

(73) Assignee: INTERDIGITAL CE PATENT HOLDINGS, SAS, Paris (FR)

(*) Notice: Subject to any disclaimer, the term of this patent is extended or adjusted under 35 U.S.C. 154(b) by 118 days.

(21) Appl. No.: 16/147,660

(22) Filed: Sep. 29, 2018

(65) Prior Publication Data
US 2019/0102867 A1   Apr. 4, 2019

(30) Foreign Application Priority Data

Sep. 29, 2017 (EP) .................... 17306301

(51) Int. Cl.
*G06T 5/00* (2006.01)
*G06T 5/20* (2006.01)
(Continued)

(52) U.S. Cl.
CPC .............. *G06T 5/002* (2013.01); *G06T 5/005* (2013.01); *G06T 5/20* (2013.01); *G06T 7/593* (2017.01);
(Continued)

(58) Field of Classification Search
CPC ........... G06T 5/002; G06T 5/00; G06T 5/001; G06T 5/005; G06T 5/20; G06T 7/593;
(Continued)

(56) References Cited

U.S. PATENT DOCUMENTS 9,361,677 B2   6/2016 Kauff et al.
2011/0293179 A1* 12/2011 Dikmen .................. G06T 5/008
                                                            382/167
(Continued)

FOREIGN PATENT DOCUMENTS

EP   0478040    4/1992
EP   2230855    9/2010
(Continued)

OTHER PUBLICATIONS

Zhang et al., "An adaptive bilateral filter based framework for image denoising", Neurocomputing, vol. 140, Apr. 13, 2014, pp. 299-316.
(Continued)

*Primary Examiner* — Sean T Motsinger
(74) *Attorney, Agent, or Firm* — Robert D. Shedd, Esquire

(57) ABSTRACT

The disclosure concerns a method for filtering spurious pixels in a depth-map. It is important to filter a depth-map to remove the spurious pixels. One issue when filtering spurious pixels, is to remove them while preserving the boundaries of the real details of the depth-map. A known approach to filter spurious pixels is to use a bi-lateral filter. However, the bi-lateral filter is not efficient to remove the spurious pixels. The proposed solution enables to remove spurious pixels in a depth-map while preserving the sharp edges of the depth-map and smoothing faint details or noise.

11 Claims, 2 Drawing Sheets

(51) Int. Cl.
  *G06T 7/593* (2017.01)
  *H04N 13/128* (2018.01)
(52) U.S. Cl.
  CPC . *H04N 13/128* (2018.05); *G06T 2207/10028* (2013.01); *G06T 2207/20028* (2013.01)
(58) Field of Classification Search
  CPC ........... G06T 2207/10028; G06T 2207/20028; H04N 13/128
  See application file for complete search history.

(56) References Cited

U.S. PATENT DOCUMENTS

| | | | |
|---|---|---|---|
| 2012/0200669 A1 | 8/2012 | Lai et al. | |
| 2013/0222377 A1* | 8/2013 | Bruls | H04N 19/597 345/419 |
| 2013/0258058 A1* | 10/2013 | Watanabe | H04N 13/236 348/46 |
| 2017/0178305 A1* | 6/2017 | Silver | G06T 5/002 |
| 2017/0221183 A1* | 8/2017 | Mody | G06T 5/002 |
| 2019/0102867 A1* | 4/2019 | Vandame | G06T 7/593 |

FOREIGN PATENT DOCUMENTS

| | | |
|---|---|---|
| EP | 2230640 | 7/2013 |
| JP | 2006135521 | 5/2006 |
| KR | 1020130090846 | 8/2013 |

OTHER PUBLICATIONS

Pantelic et al., "The discriminative bilateral filter: An enhanced denoising filter for electron microscopy data", Journal of Structural Biology, vol. 155, No, 3, May 16, 2006, pp. 395-408.

Van Den Boomgaard et al., "On the Equivalence of Local-Mode Finding, Robust Estimation and Mean-Shift Analysis as used in Early Vision Tasks", 16th International Conference on Pattern Recognition (ICPR-2002); Quebec City, Canada, Aug. 11, 2002, pp. 1-4.

Francis et al., "The Bilateral Median Filter", 14th Annual Symposium of the Pattern Recognition Association of South Africa (PRASA'03), Langebaan, South Africa; Nov. 27, 2003, pp. 57-62.

* cited by examiner

METHOD FOR FILTERING SPURIOUS PIXELS IN A DEPTH-MAP

REFERENCE TO RELATED EUROPEAN APPLICATION

This application claims priority from European Patent Application No. 17306301.7, entitled "A METHOD FOR FILTERING SPURIOUS PIXELS IN A DEPTH-MAP", filed on Sep. 29, 2017, the contents of which are hereby incorporated by reference in its entirety.

TECHNICAL FIELD

The present invention relates to depth-maps and more particularly to a method for filtering spurious pixels which impact the use of depth-maps when performing image processing.

BACKGROUND

Depth-maps are special images where each pixel records the distance, or the inverse of the distance, or any information which is function of the distance, of the objects being observed at that position versus a camera. A depth-map may be computed, for example, using several cameras observing the same field-of-view and deducing depth with the variation of parallaxes between views. In practice, estimated depth-maps are showing spurious pixels. Many reasons make depth-map estimation difficult as for instance: objects being partially masked from one camera to the next; variation of reflected light from an object observed at different position; surfaces with no or few textures making parallax estimation difficult; sensitivity variation among cameras.

It is important to filter a depth-map to remove the spurious pixels. One issue when filtering spurious pixels, is to remove them while preserving the boundaries of the real details of the depth-map.

A known approach to filter spurious pixels is to use a bi-lateral filter. A bi-lateral filter defines a weight function $w(x, y, k, l)$ associated to a pixel $I(x, y)$. The coordinates $(k, l)$ denote the shift between the central pixel $I(x, y)$ and the pixel $I(x+k, y+l)$ for which a weight is computed.

$$w(x,y,k,l) = d(x+k,y+l) r(I(x,y), I(x+k,y+l))$$

The weight is said 'bi-lateral' since it depends on an intensity term: $r(I(x,y), I(x+k,y+l))$; and a geometrical distance term $d(x+k,y+l)$ independent from the pixel values. Typical choice of the functions r and d are:

$$d(x+k, y+l) = e^{\left(-\frac{k^2+l^2}{2\sigma_d^2}\right)}$$

$$r(I(x, y), I(x+k, y+l)) = e^{\left(-\frac{(I(x,y)-I(x+k,y+l))^2}{2\sigma_r^2}\right)}$$

The weight function w depends on 2 parameters: $\sigma_d$ which controls how much pixel $I(x+k,y+l)$ must have the same intensity than the central pixel $I(x,y)$ and; $\sigma_r$, which controls how much the distance $(k,l)$ influences the convolution filter. The intensity of a pixel is function of the distance between the pixel and the camera.

The weight is defined within for a group of $[2P+1 \times 2P+1]$ pixels centered on the pixel $I(x,y)$ such as $(k,l) \in [-P,+P]^2$. A convolution filter is defined by dividing the weight function by the sum of all the weights within the weight function:

$$I_{filter}(x, y) = \frac{\sum_{k,l} I(x+k, y+l) w(x, y, k, l)}{\sum_{k,l} w(x, y, k, l)}$$

$$= I * C(x, y)$$

The convolution filter $$C(x, y)[i, j] = \frac{w(x, y, i-P, j-P)}{\sum_{k,l} w(x, y, k, l)}$$

with $(i,j) \in [0, 2P+1]^2$ is the normalization of the weight function by its integral.

The bi-lateral filter offers an efficient filtering which enables to preserve the sharp edges of the depth-map while smoothing faint details or noise.

However, the bi-lateral filter is not efficient to remove the spurious pixels. Indeed, the spurious pixels are showing sharp edges versus the pixels directly surrounding them. The weight function $w(x,y,k,l)$ computed for a spurious pixel located at $I(x,y)$ has a high weight only for the surrounding pixels having comparable amplitude similar to $I(x,y)$. Thus, spurious pixels are not removed after a bi-lateral filtering stage. In other words, the bi-lateral filer conserves the spurious pixels even after several iterations of filtering. One option would be to increase the parameter $\sigma_d$, but this would lead to the spurious pixels being dissolved as well as sharp edges of the object boundaries.

The present invention has been devised with the foregoing in mind.

SUMMARY OF INVENTION

According to a first aspect of the invention there is provided a computer implemented method for filtering spurious pixels in a depth-map, the method comprising, for a pixel of the depth map called current pixel:

determining at least one weight for at least one pixel, called neighboring pixel, belonging to a group of pixels of said depth-map centered on the current pixel, said weight being a function of a geometrical distance between the current pixel and said at least one neighboring pixel as well as of an intensity of a pixel adjacent to the current pixel and an intensity of said at least one neighboring pixel, determining a weight function corresponding to at least one adjacent pixel, the coefficients of which being said determined weight, filtering said current pixel by applying a convolution filter corresponding to a normalized weight function maximizing a sum of all its coefficients.

The proposed solution enables to remove spurious pixels in a depth-map as would do minimum or maximum filters while preserving the sharp edges of the depth-map and smoothing faint details or noise as would do a bi-lateral filter.

Indeed, if the current pixel is a spurious pixel, the sum of all the coefficients of its weight function is not maximum compared to the sums of the coefficients of the others weight functions determined using the intensity of the adjacent pixels, because among the adjacent pixels spurious pixels are less frequent.

In the minimum/maximum filters solution, the filtered pixel is equal to the minimum of the neighboring pixels:

$$I_{min}(x,y)=\min(I(x+n,y+m)\forall(n,m)\in[-1,1]$$

or to the maximum of the neighboring pixels:

$$I_{max}(x,y)=\max(I(x+n,y+m)\forall(n,m)\in[-1,1]$$

Calling consecutively the minimum filter and then the maximum filter on an image is a so called image erosion. Calling consecutively the maximum filter on an image and then the minimum filter is called an image dilatation. The erosion filter permits to remove spurious pixels with amplitude larger than their direct surrounding. Whereas, the dilatation filter permits to remove spurious pixels with amplitude smaller than their direct surrounding. In practice erosion filter or dilation filter are able to remove spurious pixels, but affect severely the boundaries of real objects In the bi-lateral filter solution, the current pixel plays a key-role in the computation of the weight function. If the current pixel is a spurious pixel, the weight function highlights the neighboring pixels similar to the current one. Thus, after filtering, the spurious pixels are kept intact instead of being dissolved or erased.

In the solution according to an embodiment of the invention, the inventors propose to limit the role of the current pixel in the computation of a weight function by replacing the intensity of the current pixel by the intensity of an adjacent pixel when computing the weights of the weight function. Thus, the method according to the invention enables to generate as many weight functions as the number of pixels adjacent to the current pixel. In order to filter the current pixel, a weight function is selected among the plurality of the generated weight functions. The selected weight function is the one maximizing a sum of all the coefficient of the corresponding weight-function. One convolution filter is then generated from the selected weight function.

According to an embodiment of the invention, the weight of the at least adjacent pixel is given by:

$$w(r, x, y, k, l) = \begin{cases} 1 & \text{if } |r - I(x+k, y+l)| < T \\ 0 & f \ |r - I(x+k, y+l)| > T \end{cases}$$

where r is a reference value, T is a difference criterion between a pixel of the depth-map and the reference value r, (x,y) are coordinates of the current pixel and (k,l) represent the shift between the current pixel I(x,y) and the neighboring pixel for which the weight is determined.

This simplified weight function can be executed by processors with limited computation power such as those embedded in smartphones.

According to an embodiment of the invention, the weight function is a one-dimensional filter and is orthogonal to an orientation of the depth-map.

According to an embodiment of the invention, an orientation of the weight function is determined by computing an angle α which value is the arc tangent of a ratio of a local derivative of an intensity of the current pixel among a first variable x and a local derivative of an intensity of the current pixel among a second variable y.

According to an embodiment of the invention, the method further comprises:

determining a first weight function, the coefficients of which are determined as a function of the intensity of an adjacent pixel having the highest intensity among the adjacent pixels, determining a second weight function, the coefficients of which are determined as a function of the intensity of an adjacent pixel having the lowest intensity among the adjacent pixels, determining a third weight function, the coefficients of which are determined as a function of an intensity of the current pixel, determining a fourth weight function, the coefficients of which are determined as a function of an intensity which a median of the intensities of the adjacent pixels, filtering said current pixel by applying the convolution filter corresponding to a normalized weight function maximizing a sum of all its coefficients weight function maximizing a sum of all its coefficients among the four weight functions.

Generating only four weight functions reduces the computational load required for filtering spurious pixels. This four weight functions also takes advantage of the vector computation offered by GPU which is also embedded in smartphones Another object of the invention concerns a device capable of filtering spurious pixels in a depth-map, said device comprising at least one hardware processor configured to, for a pixel of the depth map called current pixel:

determine at least one weight for at least one pixel, called neighboring pixel, belonging to a group of pixels of said depth-map centered on the current pixel, said weight being a function of a geometrical distance between the current pixel and said at least one neighboring pixel as well as of an intensity of a pixel adjacent to the current pixel and an intensity of said at least one neighboring pixel, determine a weight function corresponding to at least one adjacent pixel, the coefficients of which being said determined weight, filter said current pixel by applying the convolution filter corresponding to a normalized weight function maximizing a sum of all its coefficients.

According to an embodiment of the invention, the weight of the at least adjacent pixel is given by:

$$w(r, x, y, k, l) = \begin{cases} 1 & \text{if } |r - I(x+k, y+l)| < T \\ 0 & f \ |r - I(x+k, y+l)| > T \end{cases}$$

where r is a reference value, T is a difference criterion between a pixel of the depth-map and the reference value r, (x,y) are coordinates of the current pixel and (k,l) represent the shift between the current pixel I(x,y) and the neighboring pixel for which the weight is determined According to an embodiment of the invention, the weight function is a one-dimensional filter and is orthogonal to orientation of edges of the depth-map.

According to an embodiment of the invention, an orientation of the weight function is determined by computing an angle α which value is the arc tangent of a ratio of a local derivative of an intensity of the current pixel among a first variable x and a local derivative of an intensity of the current pixel among a second variable y.

According to an embodiment of the invention, the hardware processor is further configured to:

determine a first weight function, the coefficients of which are determined as a function of the intensity of an adjacent pixel having the highest intensity among the adjacent pixels, determine a second weight function, the coefficients of which are determined as a function of the intensity of an adjacent pixel having the lowest intensity among the adjacent pixels, determine a third weight function, the coefficients of which are determined as a function of an intensity of the current pixel, determine a fourth weight function, the coefficients of which are determined as a function of an intensity which a median of the intensities of the adjacent pixels, filter said current pixel by applying the convolution filter corresponding to a normalized weight function maximizing a sum of all its coefficients among the four weight functions.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

Figure 1:
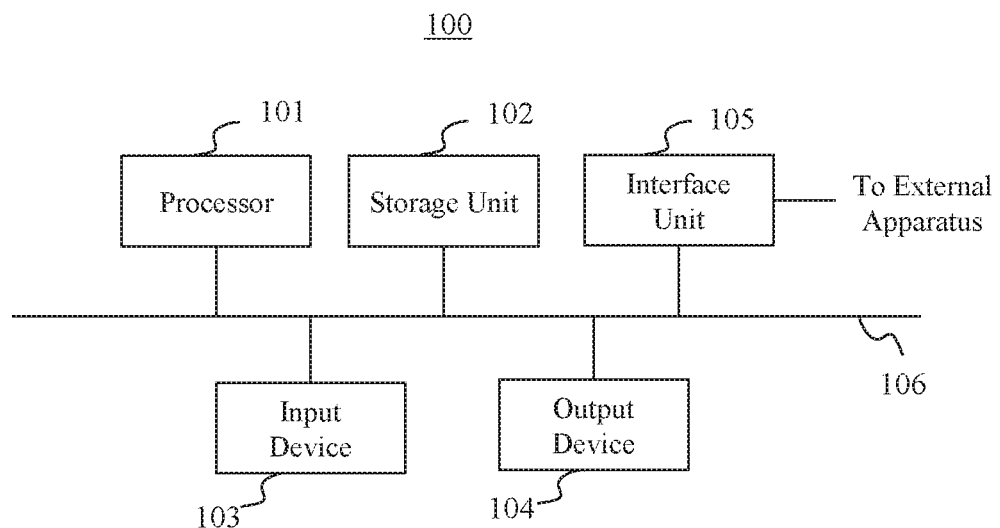
FIG. 1 is a schematic block diagram illustrating an example of a device capable of executing the methods according to an embodiment of the disclosure.

FIG. 1 is a schematic block diagram illustrating an example of a device capable of executing the methods according to an embodiment of the invention.

The apparatus 100 comprises a processor 101, a storage unit 102, an input device 103, a display device 104, and an interface unit 105 which are connected by a bus 106. Of course, constituent elements of the computer apparatus 100 may be connected by a connection other than a bus connection.

The processor 101 controls operations of the apparatus 100. The storage unit 102 stores at least one program to be executed by the processor 101, and various data, including depth-maps, parameters used by computations performed by the processor 101, intermediate data of computations performed by the processor 101, and so on. The processor 101 may be formed by any known and suitable hardware, or software, or a combination of hardware and software. For example, the processor 101 may be formed by dedicated hardware such as a processing circuit, or by a programmable processing unit such as a CPU (Central Processing Unit) that executes a program stored in a memory thereof.

The storage unit 102 may be formed by any suitable storage or means capable of storing the program, data, or the like in a computer-readable manner. Examples of the storage unit 102 include non-transitory computer-readable storage media such as semiconductor memory devices, and magnetic, optical, or magneto-optical recording media loaded into a read and write unit. The program causes the processor 101 to perform a process for manipulating a light-field image according to an embodiment of the present disclosure as described with reference to FIGS. 3-4.

The input device 103 may be formed by a keyboard, a pointing device such as a mouse, or the like for use by the user to input commands. The output device 104 may be formed by a display device to display, for example, a Graphical User Interface (GUI). The input device 103 and the output device 104 may be formed integrally by a touchscreen panel, for example.

The interface unit 105 provides an interface between the apparatus 100 and an external apparatus. The interface unit 105 may be communicable with the external apparatus via cable or wireless communication.

The apparatus 100 may be for example a portable device such as a tablet or a smartphone.

Figure 2:
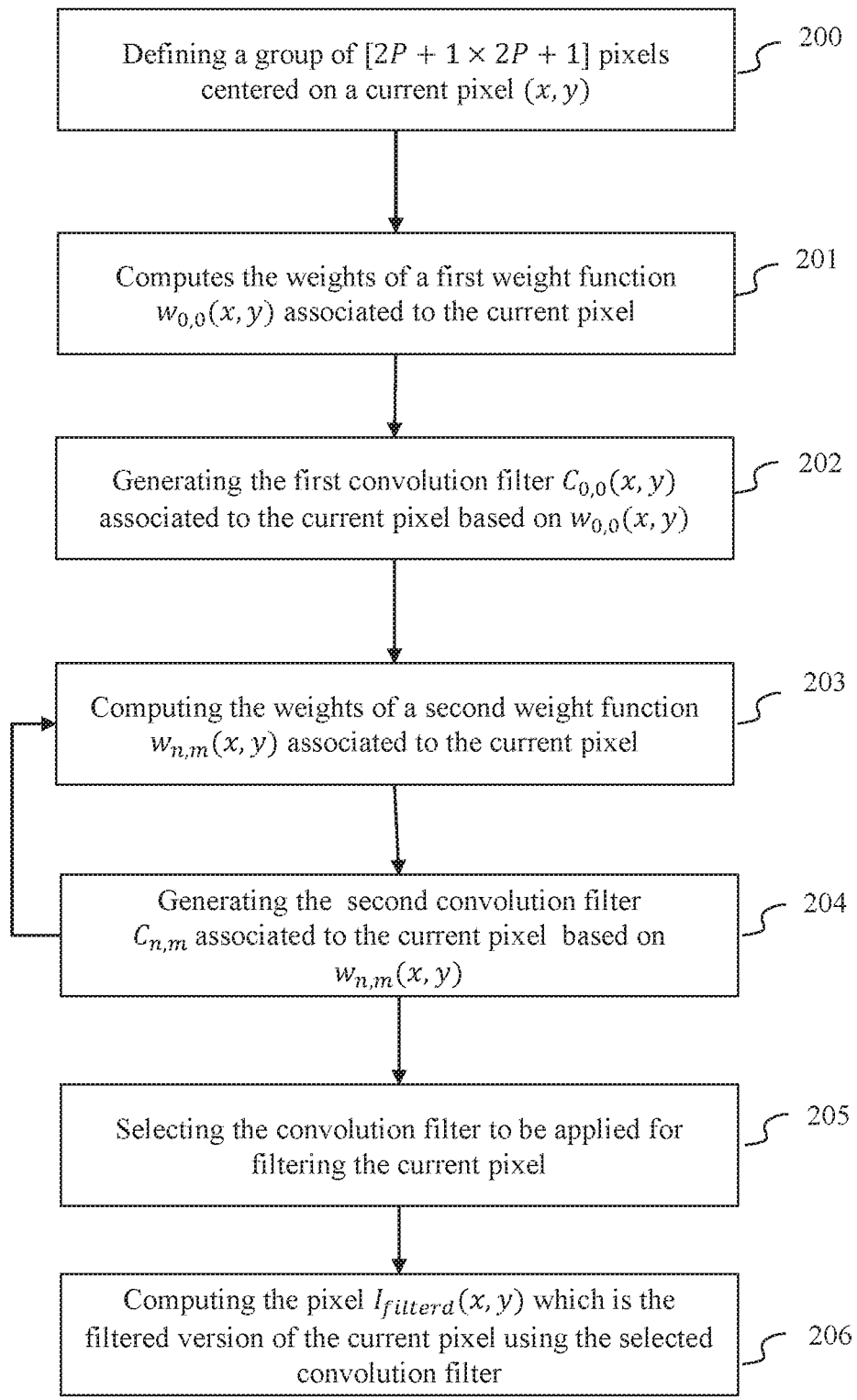
FIG. 2 represents a flowchart of the steps of a method for filtering spurious pixels of a depth-map according to an embodiment of the disclosure.

FIG. 2 represents a flowchart of the steps of a method for filtering spurious pixels of a depth-map according to an embodiment of the invention. The following steps are executed for all the pixels of the depth-map.

Figure 3:
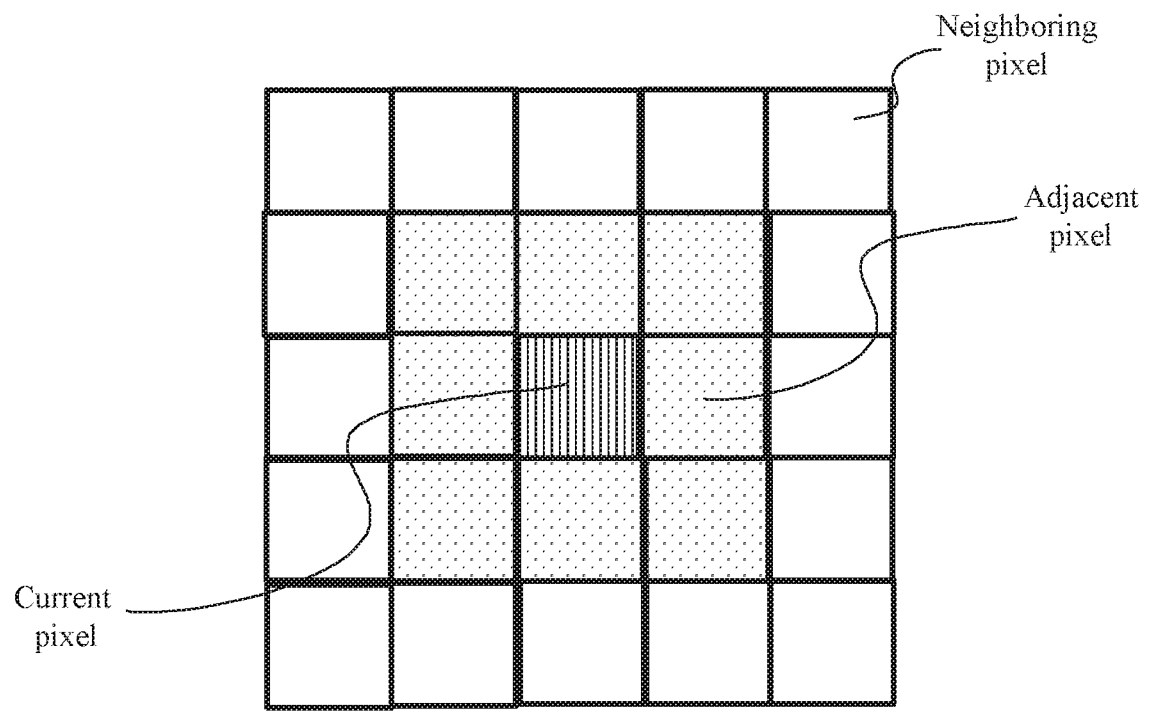
FIG. 3 represents a group of [2P+1×2P+1] pixels centered on a current pixel and called neighboring pixels.

In a step 200, the processor 101 of the device 100 defines a group of [2P+1×2P+1] pixels centered on a current pixel as represented on FIG. 3 called neighboring pixels. In FIG. 3 the group of neighboring pixels is a 5×5 group.

In a step 201, the processor 101 of the device 100 computes the weights of a first weight function $w_{0,0}(x,y)$ associated to the current pixel where (x,y) are the coordinates of the current pixel in the depth-map.

A weight $w_{0,0}(x,y,k,l)$ associated to the considered neighboring pixel is computed as followed:

$$w_{0,0}(x,y,k,l)=d(x+k,y+l)r(I(x,y),I(x+k,y+l)) \quad (1)$$

where (k,l) denotes the shift between the current pixel and the neighboring pixel which coordinates are (x+k,y+l) for which the weight is computed.

The weight depends on an intensity term: $r(I(x,y), I(x+k,y+l))$ where $I(x,y)$ is the intensity of the current pixel and $I(x+k,y+l)$ is the intensity of the neighboring pixel for which the weight is determined; and a geometrical distance term $d(x+k,y+l)$ independent from the pixel values. in an embodiment of the invention, the functions r and d are:

$$d(x+k, y+l) = e^{\left(-\frac{k^2+l^2}{2\sigma_d^2}\right)}$$

-continued $$r(I(x, y), I(x+k, y+l)) = e^{\left(-\frac{(I(x,y)-I(x+k,y+l))^2}{2\sigma_r^2}\right)}$$

The weight w depends on two parameters: $\sigma_d$ which controls how much the considered neighboring pixel must have the same intensity than the current pixel and; $\sigma^r$, which controls how much the distance (k,l) influences the weight function.

Such weights are computed for all the neighboring pixels of the current pixel.

In step 202, the first convolution filter $C_{0,0}(x,y)$ is generated from the weight function associated to the current pixel.

$$I_{filter}(x, y) = \frac{\sum_{k,l} I(x+k, y+l) w_{0,0}(x, y, k, l)}{\sum_{k,l} w_{0,0}(x, y, k, l)}$$

It is worth noting that the above-mentioned equation is typical from a local convolution filter $C_{0,0}(x,y)$ of size [2P+1×2P+1] pixels which applies to pixel with coordinate (x,y) of the depth-map. Each coefficient of the convolution filter $C_{0,0}(x,y)[i,j]$ is given by:

$$C_{0,0}(x, y)[i, l] = \frac{w_{0,0}(x, y, i-P, j-P)}{\sum_{k,l} w_{0,0}(x, y, k, l)}$$
$$= \frac{w_{0,0}(x, y, i-P, j-P)}{W_{0,0}(x, y)}$$

With $(i,j) \in [0,2P+1]^2$ and $W_{0,0}(x,y) = \sum_{i=0}^{2P+1} \sum_{j=0}^{2P+1} w_{0,0}(x,y,i-P,j-P)$ the sum of all weights of the weight function $w_{0,0}(x,y,k,l)$. Thus, the above-mentioned equation can be re-written with a convolution operator *:

$$I_{filter}(x,y) = I * C(x,y)$$

$C_{0,0}(x,y)$ is the local convolution filter associated to the current pixel (x,y). In other words the convolution filter is equal to the normalized weight function (all weights are divided by the integral of the weight function).

In a step 203, the processor 101 of the device 100 computes the weights of a second weight function $w_{n,m}$ associated to the current pixel.

A weight $w_{n,m}(x+n,y+m, k, l)$ associated to the considered neighboring pixel is computed as followed:

$$w(x+n,y+m,k,l) = d(x+k,y+l) r(I(x+n,y+m),I(x+k,y+l))$$

where (k,l) denotes the shift between the current pixel, (n,m) are the coordinates of the considered pixel adjacent to the current pixel and the neighboring pixel which coordinates are (x+k,y+l) for which the weight is computed. In an embodiment of the invention, one can define $(n,m) \in [-1; 1]$ to compute 9 weight functions.

The weight depends on an intensity term: $r(I(x+n,y+m), I(x+k,y+l))$ where $I(x+n,y+m)$ is the intensity of a pixel adjacent to the current pixel and $I(x+k,y+l)$ is the intensity of the neighboring pixel for which the weight is determined; and a geometrical distance term $d(x+k,y+l)$ independent from the pixel values.

In an embodiment of the invention, the functions r and d are:

$$d(x+k, y+l) = e^{\left(-\frac{k^2+l^2}{2\sigma_d^2}\right)}$$

$$r(I(x+n, y+m), I(x+k, y+l)) = e^{\left(-\frac{(I(x+n,y+m)-I(x+k,y+l))^2}{2\sigma_r^2}\right)}$$

Such weights are computed for all the neighboring pixels of the current pixel.

In step 204, the second convolution filter $C_{n,m}(x,y)$ associated to the current pixel is generated based on $w_{n,m}(x+n, y+m,k,l)$.

In an embodiment of the invention, steps 203 and 204 are executed for each pixel adjacent to the current pixel generating as many weight functions.

In another embodiment of the invention, steps 203 and 204 are executed three times generating three weight functions In this embodiment, a second weight function is generated where $I(x+n,y+m)$ is the intensity of the pixel adjacent to the current pixel having the highest intensity among all the pixel adjacent to the current pixel.

A third weight function is generated where $I(x+n,y+m)$ is the intensity of the pixel adjacent to the current pixel having the lowest intensity among all the pixel adjacent to the current pixel.

A fourth weight function is generated where $I(x+n,y+m)$ is the median of the intensities of the pixels adjacent to the current pixel.

In a step 205, the convolution filter to be applied for filtering the current pixel is selected among the plurality of convolution filter generated during steps 201 to 204.

The processor 101 of the device 100 computes the sum $W_{n,m}(x,y)$ of all coefficients of a weight function $w_{n,m}(x+n,y+m,k,l)$.

The selected weight function $w_{n,m}$ is the one having the maximum $W_{n,m}(x,y)$. Accordingly the selected convolution filter $C_{n,m}(x,y)$ is the one associated to the maximum $W_{n,m}(x,y)$.

In a step 206, the selected convolution filter is used to compute the pixel $I_{filtered}(x,y)$ which is the filtered version of the current pixel.

According to the invention, when the current pixel is a spurious pixel, its weight function $w_{0,0}(x,y)$ has a small sum $W_{0,0}(x,y)$ compared to the others weight functions because in the P adjacent pixels, for which a weight function $w_{n,m}(x,y)$ is computed, spurious pixels are less frequent.

In an embodiment of the invention, the selected weight function is normalized such that its integral is equal to 1.0.

The method described in reference to FIG. 2 may be applied to all pixels of the depth-map. Possibly the method is iterated several times. In an embodiment of the invention, the parameters P, $\sigma_d$ and $\sigma_r$, are chosen manually by a user based on eye inspection.

In an embodiment of the invention, a simpler weight defined by:

$$w(r, x, y, k, l) = \begin{cases} 1 & \text{if } |r - I(x+k, y+l)| < T \\ 0 & f \; |r - I(x+k, y+l)| > T \end{cases}$$

where r is a reference value, and T is a difference criterion between a depth-map pixel versus the reference value r, is used. This weigh is computed easily with GPU instructions like 'step' and 'abs' which permit to estimate w in two instructions.

In another embodiment of the invention, the weight function is a one-dimensional (1D) weight function made of 2P+1 pixels. The 1D weight function is oriented perpendicularly to the contours of the depth-map image.

An angle α of the orientation of the 1D weight function is obtained by computing local derivatives: $D_x(x,y)=I(x-1,y)-I(x+1,y)$ and $D_y(x,y)=I(x,y-1)-I(x,y+1)$. The value of the angle α is then given by:

$$-\alpha = \operatorname{atan}(D_y/D_x) + \pi/2$$

In this embodiment of the invention, the convolution filter applied to the current pixel is:

$$I_{filter}(x,y) = \Sigma_{i=-P}^{P} I(x+i\cos(\alpha), y+\sin(\alpha)) C_{n,m}(x,y)[i]$$

Where $C_{n,m}(x,y)$ is the convolution filter computed from the weight function $w_{n,m}(x,y)$ having the maximum $W_{n,m}(x,y)$.

In this case, the pixel coordinate to access $I(x+i\cos(\alpha), y+\sin(\alpha))$ is not an integer. With GPU implementation, accessing non-integer coordinates is straight forward with bi-linear interpolation. GPU's are optimized to access non-integer as efficiently as integer coordinates.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method for filtering pixels in a depth-map, the method comprising, for a pixel of the depth map called a current pixel:
   generating a plurality of weight functions, one of the plurality of weight functions being generated for each pixel of a group of pixels of said depth-map centered on the current pixel, each of said plurality of weight functions having at least one coefficient determined as a function of a geometrical distance between the current pixel and at least one neighboring pixel as well as of an intensity of a pixel adjacent to the current pixel and an intensity of said at least one neighboring pixel,
   determining for each of the plurality of weight functions a sum of the at least one coefficient of the weight function,
   selecting a one of the plurality of weight functions corresponding to one adjacent pixel and maximizing the sum of the at least one coefficient,
   filtering said current pixel by applying a convolution filter corresponding to the selected one of the plurality of weight functions.

2. The method according to claim 1 wherein generating the plurality of weight functions comprises determining a weight of at least one adjacent pixel given by:

$$w(r, x, y, k, l) = \begin{cases} 1 & \text{if } |r - I(x+k, y+l)| < T \\ 0 & f\ |r - I(x+k, y+l)| > T \end{cases}$$

where r is a reference value, T is a difference criterion between a pixel of the depth-map and the reference value r, (x, y) are coordinates of the current pixel and (k, l) represent the shift between the current pixel I(x, y) and the neighboring pixel for which the weight is determined.

3. The method according to claim 1 wherein at least one of the plurality of weight functions is a one-dimensional filter and is orthogonal to an orientation of the depth-map.

4. The method according to claim 3 wherein the orientation is determined by computing an angle α which value is the arc tangent of a ratio of a local derivative of an intensity of the current pixel among a first variable x and a local derivative of an intensity of the current pixel among a second variable y.

5. The method according to claim 1, wherein generating the plurality of weight functions comprises:
   determining a first weight function, the coefficients of which are determined as a function of the intensity of an adjacent pixel having the highest intensity among the adjacent pixels,
   determining a second weight function, the coefficients of which are determined as a function of the intensity of an adjacent pixel having the lowest intensity among the adjacent pixels,
   determining a third weight function, the coefficients of which are determined as a function of an intensity of the current pixel,
   determining a fourth weight function, the coefficients of which are determined as a function of an intensity which is a median of the intensities of the adjacent pixels,
   and wherein selecting the one of the plurality of weight functions comprises selecting from among the first through fourth weight functions.

6. A device capable of filtering pixels in a depth-map, said device comprising at least one processor configured to, for a pixel of the depth map called a current pixel:
   generate a plurality of weight functions, one of the plurality of weight functions being generated for each pixel of a group of pixels of said depth-map centered on the current pixel, each of said plurality of weight functions having at least one coefficient determined as a function of a geometrical distance between the current pixel and at least one neighboring pixel as well as of an intensity of a pixel adjacent to the current pixel and an intensity of said at least one neighboring pixel,
   determine for each of the plurality of weight functions a sum of the at least one coefficient of the weight function,
   select a one of the plurality of weight functions corresponding to one adjacent pixel and maximizing the sum of the at least one coefficient,
   filter said current pixel by applying the convolution filter corresponding to the selected one of the plurality of weight functions.

7. The device according to claim 6 wherein the at least one processor being configured to generate the plurality of weight functions comprises the at least one processor being further configured to determining a weight of the at least one adjacent pixel given by:

$$w(r, x, y, k, l) = \begin{cases} 1 & \text{if } |r - I(x+k, y+l)| < T \\ 0 & f\ |r - I(x+k, y+l)| > T \end{cases}$$

where r is a reference value, T is a difference criterion between a pixel of the depth-map and the reference value r, (x, y) are coordinates of the current pixel and (k, l) represent the shift between the current pixel I(x, y) and the neighboring pixel for which the weight is determined.

8. The device according to claim 6 wherein at least one of the plurality of-weight functions is a one-dimensional filter and is orthogonal to an orientation of the depth-map.

9. The device according to claim 8 wherein the orientation is determined by computing an angle $\alpha$ which value is the arc tangent of a ratio of a local derivative of an intensity of the current pixel among a first variable x and a local derivative of an intensity of the current pixel among a second variable y.

10. The device according to claim 6 wherein the processor being configured to generate the plurality of weight functions comprises the processor being further configured to:
   determine a first weight function, the coefficients of which are determined as a function of the intensity of an adjacent pixel having the highest intensity among the adjacent pixels,
   determine a second weight function, the coefficients of which are determined as a function of the intensity of an adjacent pixel having the lowest intensity among the adjacent pixels,
   determine a third weight function, the coefficients of which are determined as a function of an intensity of the current pixel,
   determine a fourth weight function, the coefficients of which are determined as a function of an intensity which a median of the intensities of the adjacent pixels,
   and wherein the at least one processor being configured to select the one of the plurality of weight functions comprises the at least one processor being further configured to select from among the first through fourth weight functions.

11. A non-transitory computer readable storage medium carrying instructions of program code for executing the method according to claim 1, when said program code is executed on a computing device.

* * * * *

UNITED STATES PATENT AND TRADEMARK OFFICE
CERTIFICATE OF CORRECTION

| | | |
|---|---|---|
| PATENT NO. | : 10,832,382 B2 | Page 1 of 1 |
| APPLICATION NO. | : 16/147660 | |
| DATED | : November 10, 2020 | |
| INVENTOR(S) | : Benoit Vandame, Neus Sabater and Guillaume Boisson | |

It is certified that error appears in the above-identified patent and that said Letters Patent is hereby corrected as shown below:

In the Claims

In Claim 8, at Column 11, Line 7, delete "of-weight" and insert --of weight--

Signed and Sealed this
Twentieth Day of September, 2022

Katherine Kelly Vidal
*Director of the United States Patent and Trademark Office*